United States Patent
Campbell et al.

(10) Patent No.: US 9,497,530 B1
(45) Date of Patent: Nov. 15, 2016

(54) PERSONALIZATION OF AUDITORY STIMULUS

(71) Applicant: NURA HOLDINGS PTY LTD, Brunswick (AU)

(72) Inventors: Luke John Campbell, Brunswick (AU); Kyle Damon Slater, Brunswick (AU)

(73) Assignee: NURA HOLDINGS PTY LTD, Brunswick (AU)

( * ) Notice: Subject to any disclaimer, the term of this patent is extended or adjusted under 35 U.S.C. 154(b) by 0 days.

(21) Appl. No.: 15/154,694

(22) Filed: May 13, 2016

(30) Foreign Application Priority Data

Aug. 31, 2015 (AU) .............................. 2015903530
Jan. 14, 2016 (AU) .............................. 2016900105
Jan. 14, 2016 (AU) .............................. 2016900106
Jan. 14, 2016 (AU) .............................. 2016900107

(51) Int. Cl.
*H04R 1/10* (2006.01)
*H04R 29/00* (2006.01)
*G06F 17/30* (2006.01)

(52) U.S. Cl.
CPC ........... *H04R 1/10* (2013.01); *G06F 17/30764* (2013.01); *H04R 29/001* (2013.01)

(58) Field of Classification Search
CPC ................ H04R 1/10; H04R 1/1008; H04R 1/1016; H04R 29/00; H04R 29/001; H04R 25/70; H04R 2460/00; H04R 2460/05; H04R 2460/15; H04R 25/305; H04R 25/353; H04R 25/356; H04R 25/50; H04R 25/507; G06F 17/30764

USPC ........ 381/56, 58, 59, 60, 74, 101, 102, 107, 381/108, 309, 370, 375; 700/94; 73/585; 600/559

See application file for complete search history.

(56) References Cited

U.S. PATENT DOCUMENTS 7,529,379 B2 * 5/2009 Zurek ................ G06K 9/00885
381/320
8,187,202 B2 * 5/2012 Akkermans ............ A61B 5/117
382/115

(Continued)

FOREIGN PATENT DOCUMENTS

EP 2581038 A1 4/2013
WO 2011116002 A1 9/2011

*Primary Examiner* — Xu Mei
*Assistant Examiner* — Jason R Kurr
(74) *Attorney, Agent, or Firm* — Perkins Coie LLP

(57) ABSTRACT

Technology presented herein increases a user's enjoyment of sound by personalizing an audio signal so that the user perceives the audio signal as if the user had ideal hearing and/or desired hearing. In one embodiment, headphones on a user's head include a sensor and a speaker. While the speaker plays an audio signal to the user, the sensor records the user's response to the audio signal. The sensor can be a microphone, a brainwave sensor, an EEG sensor, etc. The user's response can be the audio response inside the user's ear, the brainwave response associated with the user, electrical skin response associated with the user, etc. Based on the measured response, and based on the knowledge of how other people perceive sound, the audio signal is modified to compensate for the difference between the user's hearing and the ideal hearing and/or desired hearing, therefore increasing the user's enjoyment of sound.

28 Claims, 16 Drawing Sheets

(56) References Cited

U.S. PATENT DOCUMENTS

| | | | |
|---|---|---|---|
| 8,213,649 B2 * | 7/2012 | Goldstein | A61B 5/12 381/312 |
| 8,218,779 B2 * | 7/2012 | Isberg | G10K 11/178 381/317 |
| 8,271,075 B2 | 9/2012 | Chuang et al. | |
| 8,825,149 B2 | 9/2014 | Skoe et al. | |
| 2002/0057805 A1 * | 5/2002 | Kato | G06K 9/00 381/56 |
| 2007/0106169 A1 | 5/2007 | Fadem et al. | |
| 2007/0185533 A1 | 8/2007 | Gerdes et al. | |
| 2008/0013777 A1 | 1/2008 | Park et al. | |
| 2010/0119093 A1 | 5/2010 | Uzuanis et al. | |
| 2012/0051569 A1 | 3/2012 | Blamey et al. | |
| 2012/0300964 A1 | 11/2012 | Ku et al. | |
| 2014/0247952 A1 * | 9/2014 | Goldstein | H04R 1/1016 381/74 |

* cited by examiner

PERSONALIZATION OF AUDITORY STIMULUS

CROSS-REFERENCE TO RELATED APPLICATIONS

This application claims priority to the Australian provisional patent application Serial Number 2015903530 filed Aug. 31, 2015, the Australian provisional patent application Serial Number 2016900105 filed Jan. 14, 2016, the Australian provisional patent application Serial Number 2016900106 filed Jan. 14, 2016, and the Australian provisional patent application Serial Number 2016900107 filed Jan. 14, 2016, all of which are incorporated herein by reference in their entirety.

TECHNICAL FIELD

The present invention relates generally to the provision of an auditory stimulus by one or more loudspeakers, such as consumer headphones or earphones, and in particular to the personalization of the auditory stimulus produced by such loudspeakers in order to adjust for the unique characteristics of a user's hearing.

BACKGROUND

Audio headphones are generally designed to transduce an electronic input signal to an acoustic wave across a frequency range with the expectation that all users hear in the same way. Standard audio headphones are unable to take into account differences in conductive and sensorineural hearing in users. Hearing loss is experienced by many people, especially with aging, and even people with "normal hearing" have varying sensitivity to different frequencies of sound. The clinical definition of "normal" hearing is wide (i.e., thresholds between −10 to +25 dB across frequency).

In order to select headphones that are best suited to an individual user, that user is currently limited to trying a range of headphones and picking those that best "fit" that user's hearing. Users will try various on-ear, over-ear or in-ear headphones or earbuds and make a subjective assessment of the best sound reproduction available for them.

While some headphones allow a user to manually adjust audio equalization, either by operation of controls available on the headphones themselves or via a wired or wireless connection to a smartphone app or the like, such equalization is once again based on manual adjustment by the user rather than audiometric information.

It would be desirable to provide a method of personalizing an auditory stimulus, produced by one or more loudspeakers configured to be held in place close to or in a user's ear, that uses subjective and/or objective audiometric information to automatically adapt said auditory stimulus to be well suited to a user's hearing profile. It would also be desirable to provide a method of personalizing an auditory stimulus produced by one or more loudspeakers that ameliorates or overcomes one or more disadvantages of known sound reproduction techniques.

SUMMARY

Presented here is an apparatus and method to increase a user's enjoyment of sound by personalizing an audio signal so that the user perceives the audio signal as if the user had ideal hearing and/or desired hearing. In one embodiment, headphones on a user's head include a sensor and a speaker. While the speaker plays an audio signal to the user, the sensor records the user's response to the audio signal. The sensor can be a microphone, a brainwave sensor, an EEG sensor, etc. The user's response can be the audio response inside the user's ear, the brainwave response associated with the user, the electrical skin response associated with the user, etc. Based on the measured response, and based on the knowledge of how people perceive sound, the audio signal is modified to compensate for the difference between the user's hearing and ideal hearing and/or desired hearing, therefore increasing the user's enjoyment of sound.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
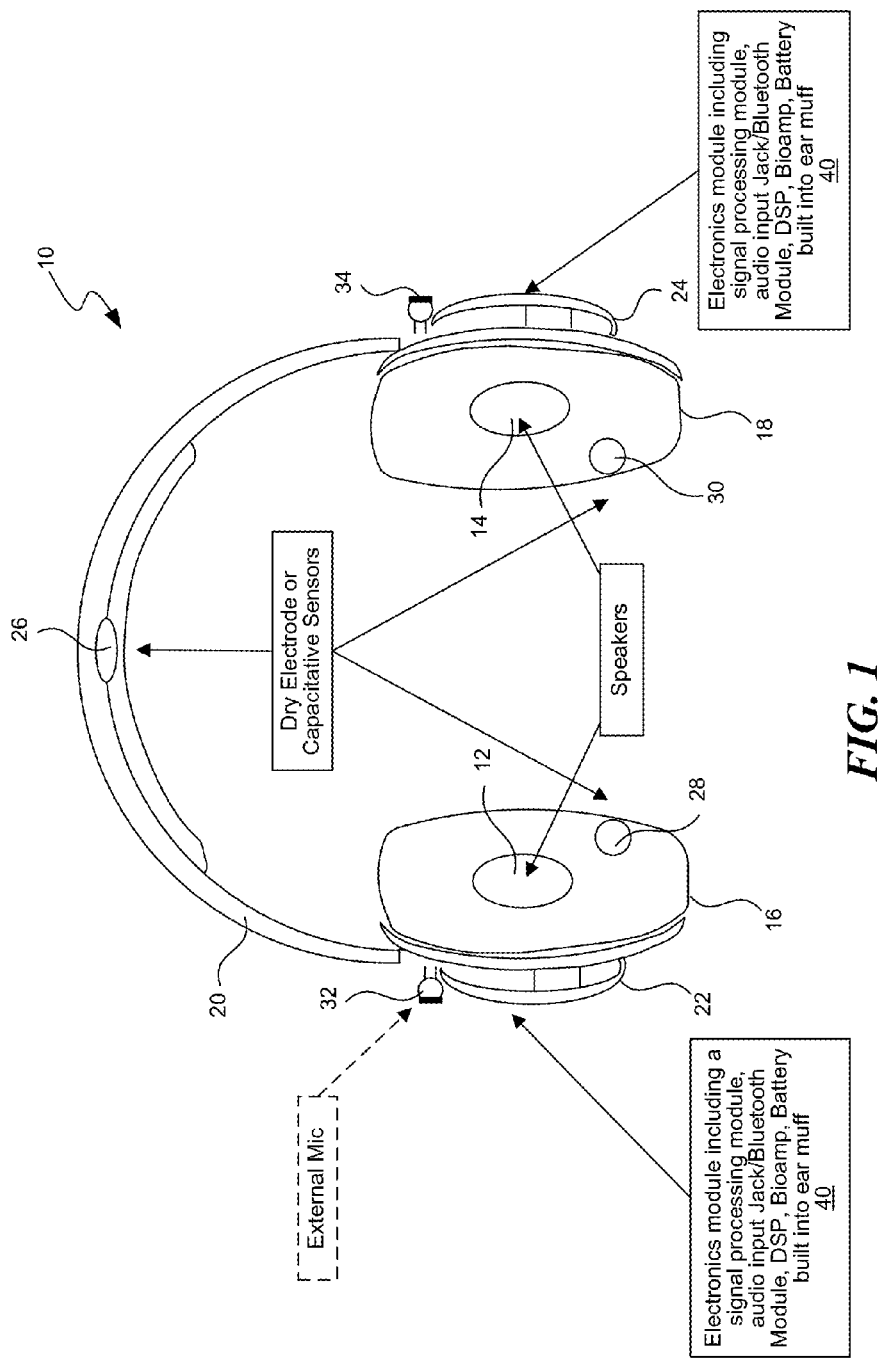
FIG. 1 depicts a set of headphones including a dry electrode or capacitive sensors, speakers, and a signal processing module, according to one embodiment.

Brief definitions of terms, abbreviations, and phrases used throughout this application are given below.

"Ideal hearing" is the average level of perception across the audible frequency spectrum of young, ontologically normal ears when a constant amplitude across the audible frequency spectrum is provided as the audio stimulus.

"Desired Hearing" is the desired level of perception across the audible frequency spectrum when a constant amplitude across the audible frequency spectrum is provided as the audio stimulus. The desired hearing profile can be arbitrarily set and may or may not be set as ideal hearing profile.

"Normal hearing" is a range around the ideal hearing. Many people are considered to have "normal hearing," meaning that their hearing sensitivity is within 15-20 dB of ideal hearing across frequencies.

"Hearing transfer function" correlates a given input frequency and a corresponding input amplitude associated with an input audio signal, to a perceived amplitude of the given input frequency.

"Hearing profile" comprises a set of measurements of a person's hearing based on which that person's hearing transfer function can be estimated.

"Channels of audio" are separate audio signals coming from one source or separate sources. Multiple channels of audio could be combined and played through the same speaker or they could be played from separate speakers.

"Statistical information representing data regarding human hearing profiles," i.e., "statistical information," is a collection of statistics regarding the hearing profiles of many people. Statistical information comprises one or more of: the average of human hearing profiles at one or more frequencies, the standard deviation of human hearing profiles at one or more frequencies, hearing profiles or hearing transfer functions of individual listeners, and correlations between types of objective or subjective hearing data.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification do not necessarily all refer to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed therebetween, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to locally executed software, software executed in the cloud, hardware, or firmware components (or any combination thereof). Modules are typically functional components that can generate useful data or other output using specified input(s). A module may or may not be self-contained. An application program (also called an "application") may include one or more modules, or a module may include one or more applications.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms or elements may be highlighted, for example, by use of capitalization, italics, and/or quotation marks. The use of highlighting has no influence on the scope and meaning of a term; the scope and meaning of a term are the same, in the same context, whether or not the term is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Headphones

FIG. 1 depicts a set of headphones including a dry electrode or capacitive sensors, speakers and an electronics module including a signal processing module, according to one embodiment. A set of headphones 10 includes the speakers 12 and 14 located within cups 16 and 18 in order to position the speakers 12 and 14 close to both of a user's ears. The two cups 16 and 18 are coupled to an adjustable head support member 20. To the rear of the cups 16 and 18 are located housings 22 and 24 housing electrical/electronic modules and interface units, the function of which is described below. In addition, the headphones 10 include dry electrode or capacitive sensors 26, 28 and 30 positioned to make contact with the user's head so as to measure auditory evoked potentials generated by the user in response to an auditory stimulus applied to one or both of the user's ears through the speakers 12 and 14. The headphones 10 can further include external microphones 32 and 34.

Figure 2:
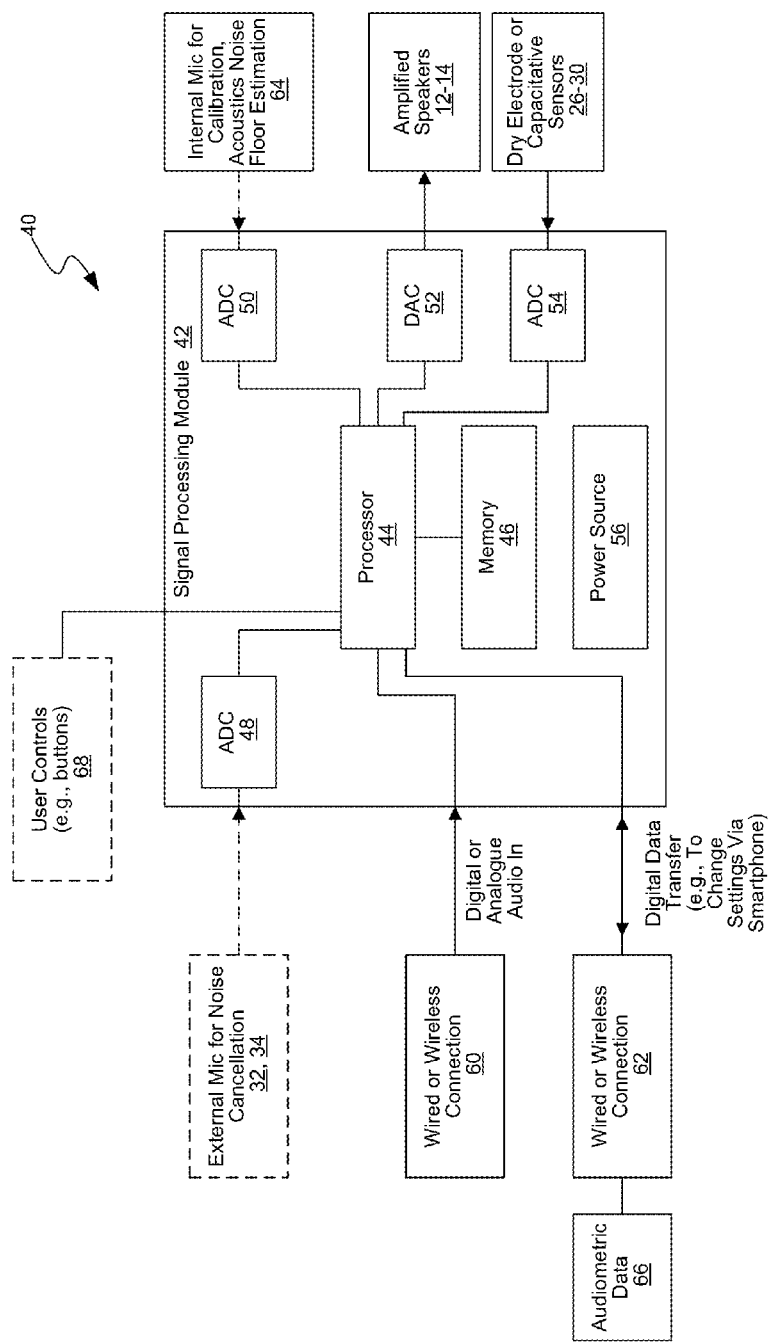
FIG. 2 is a schematic diagram depicting the electrical components of the signal processing module located within each of the housings of the headphones, according to one embodiment.

FIG. 2 is a schematic diagram depicting the electrical components located within each of the housings 22 and 24 of the headphones 10, according to one embodiment. The electronics module 40 includes a signal processing module 42, wired or wireless connections 60 and 62 (such as an audio input jack or Bluetooth module), and an external microphone 32, 34 for noise cancellation. The signal processing module 42 further includes analog-to-digital and/or digital-to-analog converters 48 to 54 for interfacing with external digital or analog devices, together with a power source 56 providing power to the signal processing module 42. Interconnected to the signal processing module 42 are an interface for external microphones 32 and 34, a wired or wireless connection 60 for receiving digital or audio analog signal inputs, as well as a wired or wireless connection 62 for digital data transfer, for example, to change stored settings maintained in the memory 46 of the signal processing module 42 to control operation of the processor 44 or to output audiometric data for display on a smartphone. The wired connection can be a phone jack, while the wireless connection can be a Bluetooth module. In this exemplary embodiment, the external microphones 32 and 34 are used by the signal processing module 42 to record ambient noise for use in noise cancellation operations. However, in other embodiments the signal processing module 42 may exclude results if ambient noise recorded by the microphones is too high.

The dry electrode or capacitive sensors 26, 28, and 30 are interconnected via the analog-to-digital converter 54. The loudspeakers 12 and 14 are interconnected to the signal processing module 42 by means of a digital-to-analog converter 52 and amplifier. Optionally, an internal microphone 64 is provided for calibration of the operations of the headphones 10.

The signal processing module 42 is also adapted to receive audiometric data 66 via the wired or wireless connection 62. The audiometric data 66 characterizes the audible threshold or equal loudness curve of the user across a frequency range. In one or more embodiments, that audiometric data 66 may be provided by an external source; for example, the results of an audiogram testing process may be provided by an audiologist. The audiometric data 66 can be input via a wired or a wireless connection 62 into the signal processing module 42.

Optionally, user controls, such as a button 68, may be provided on the headset 10 to enable the user to generate input signals to the processor 44 in response to the user's perception of auditory stimuli provided by the loudspeakers 12 and 14.

Figure 3:
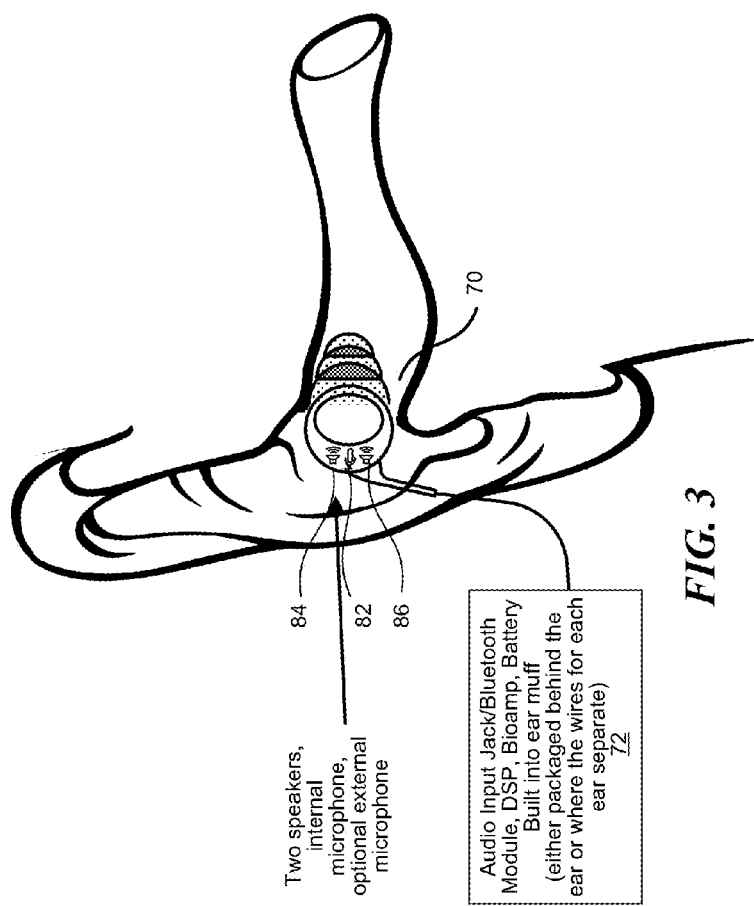
FIG. 3 depicts an alternative arrangement to that shown in FIG. 1, according to one embodiment.

FIG. 3 depicts an alternative arrangement to that shown in FIG. 1, according to one embodiment. An earbud 70 arrangement adapted to be located within the ear canal of one of a user's ears includes two speakers 84 and 86, an internal microphone 82, and an optional external microphone. The earbud 70 is connected to an electronics module 72 similar to that located in the housings 22 and 24 of the headset 10 depicted in FIG. 1.

Figure 4A:
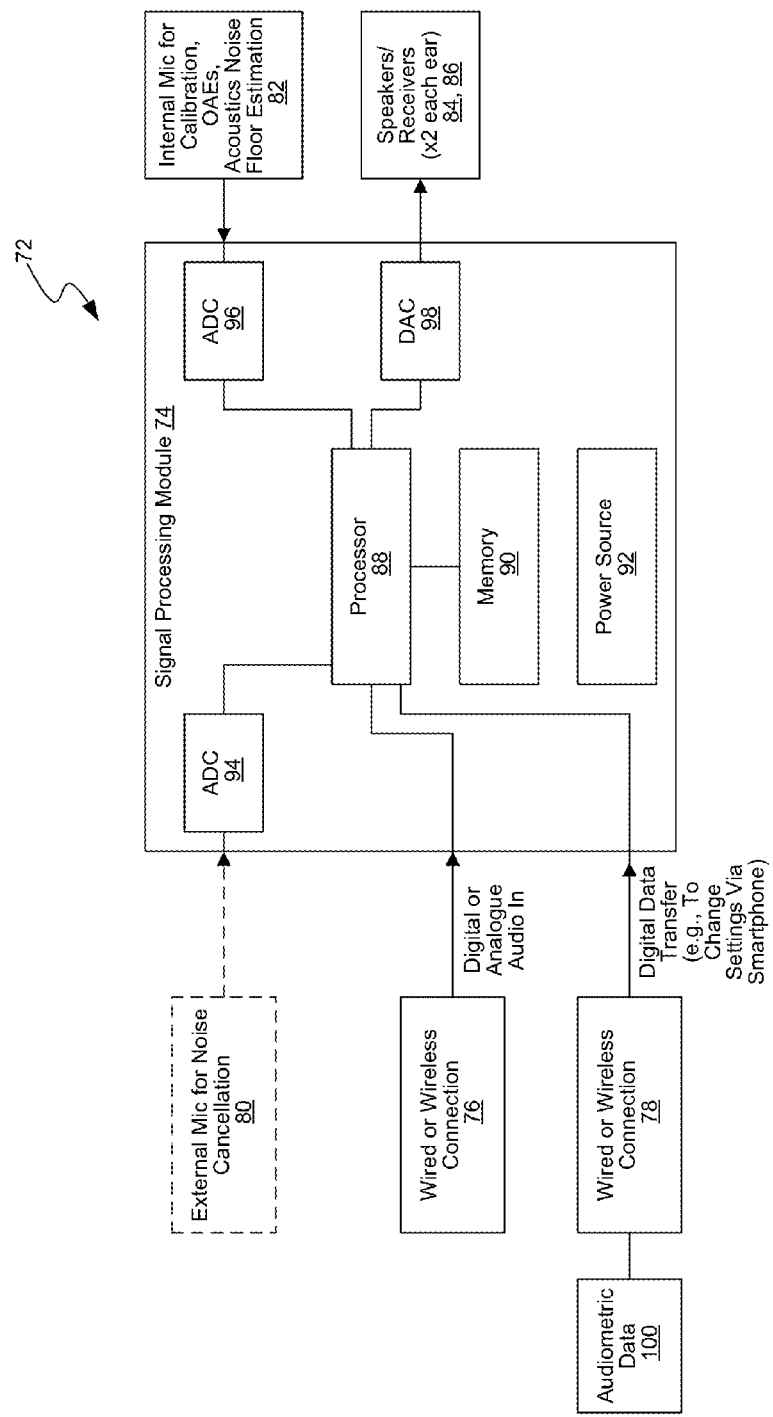
FIG. 4A is a schematic diagram of the electrical components of the digital signal processing module of the earbud arrangement shown in FIG. 3, according to one embodiment.

FIG. 4A is a schematic diagram of the electrical and electronic components of the earbud 70 arrangement shown in FIG. 3, according to one embodiment. The electronics module 72 includes a signal processing module 74, wired or wireless connections 76 and 78 (such as an audio input jack or wireless module), and an optional external microphone 80 for noise cancellation. The internal microphone 82 for calibration and for measurement of otoacoustic emissions (OAEs) is co-located with the earbud 70, as are the loudspeakers 84 and 86 that form part of the earbud 70. In this arrangement, two speakers per ear are included to allow measurement of distortion-product otoacoustic emissions. Distortion-product otoacoustic emissions (DP-OAEs) are generated in the cochlea in response to two tones of a given frequency and sound pressure level presented in the ear canal. DP-OAEs are an objective indicator of normally functioning cochlea outer hair cells. Other types of otoacoustic emissions may only require one speaker per ear canal.

The processing unit 74 includes a processor 88 for executing operations of the processing unit, a memory 90 for storing programming instructions and data used by the processor 88 during program execution, a power source 92, such as a battery, for providing power to the various electronic components in the processing unit 74, as well as analog-to-digital or digital-to-analog converters 94, 96, and 98 in order to enable the processing unit 74 to interface with the various devices such as external microphone 80, internal microphone 82, and speakers 84 and 86. In addition, the processing unit 74 is adapted to receive audiometric data 100 via wired or wireless connection 78 from an external source, such as an audiogram test result provided by an audiologist.

Figure 4B:
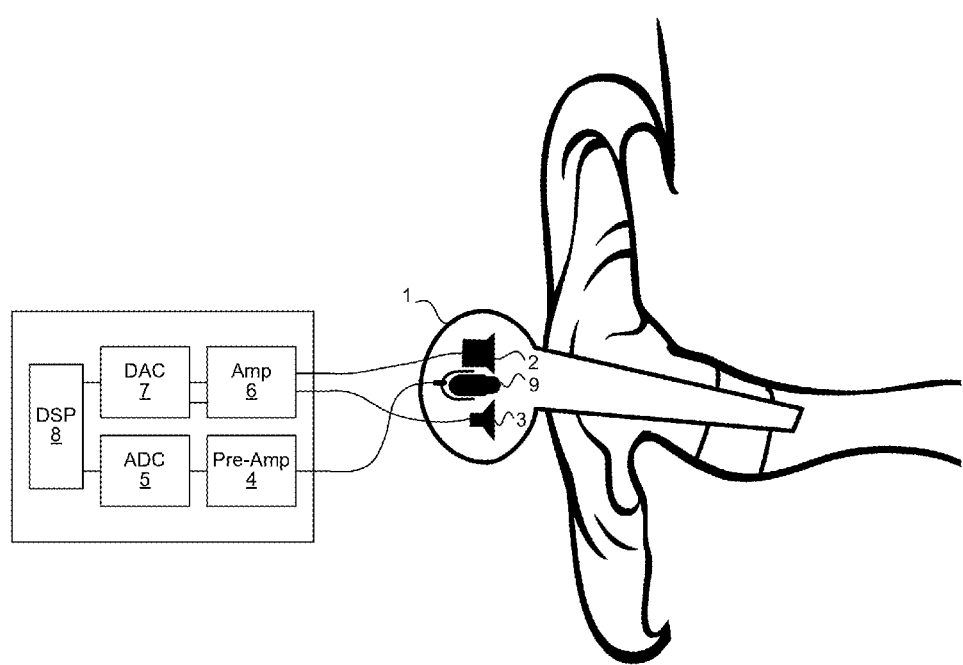
FIG. 4B shows a schematic of a probe for measurement of distortion-product otoacoustic emissions (DP-OAE), according to one embodiment.

FIG. 4B shows a schematic of a probe for measurement of distortion-product otoacoustic emissions, according to one embodiment. DP-OAE probe 1 includes two balanced armature speakers, a woofer 2 and a tweeter 3, and a microphone 9. The microphone 9 is connected to a preamplifier 4 and analog-to-digital converter 5. The speakers 2 and 3 are connected to a dual-channel headphone amplifier 6, which is connected to a dual-channel digital-to-analog converter 7. Converters 5 and 7 are connected to a digital signal processor 8, which provides equalization to control the stimuli loudness in test mode, playback equalization (if desired) and a digital crossover to the two receivers. An embodiment of this invention includes one probe for each ear.

Figure 4C:
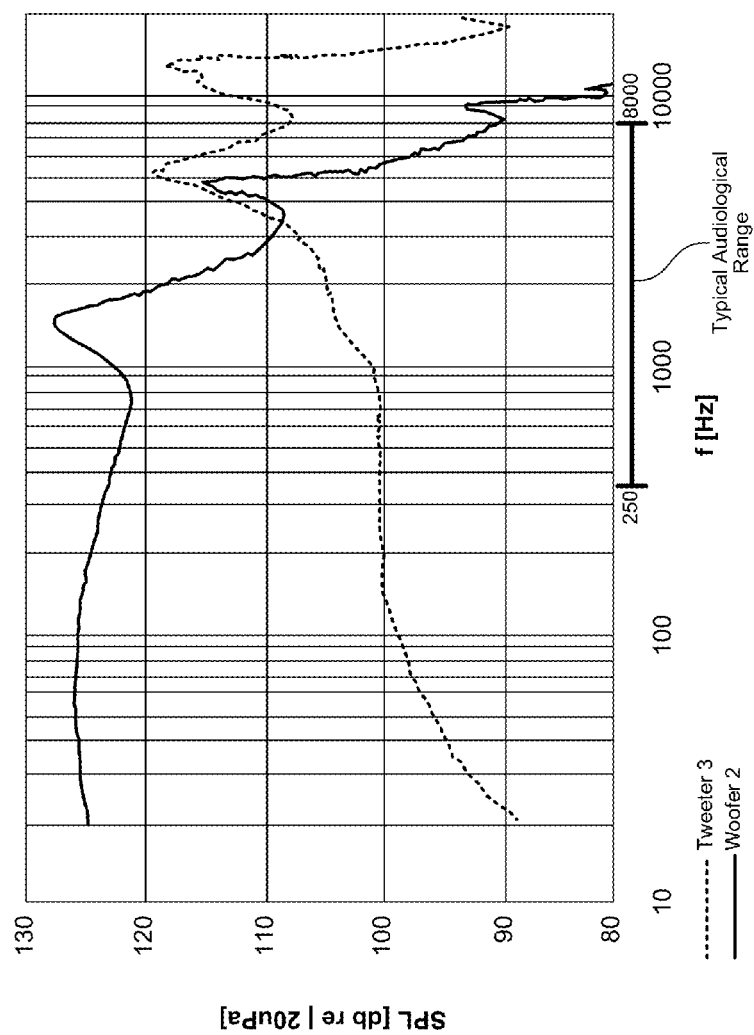
FIG. 4C shows a frequency response of each speaker in FIG. 4B, according to one embodiment.

FIG. 4C shows a frequency response of each speaker in FIG. 4B, according to one embodiment. Both woofer 2 and tweeter 3 are capable of generating stimuli of sufficient loudness over the standard audiological testing frequency and loudness range, which is approximately 250 Hz to 8000 Hz up to 80 dB sound pressure level (SPL). Using both speakers 2 and 3 with a crossover in playback mode would provide superior coverage of the frequency range. The data has been adapted from the datasheets of the commercially available Knowles HODVTEC-31618-000 and SWFK-31736-000 receivers.

Figure 4D:
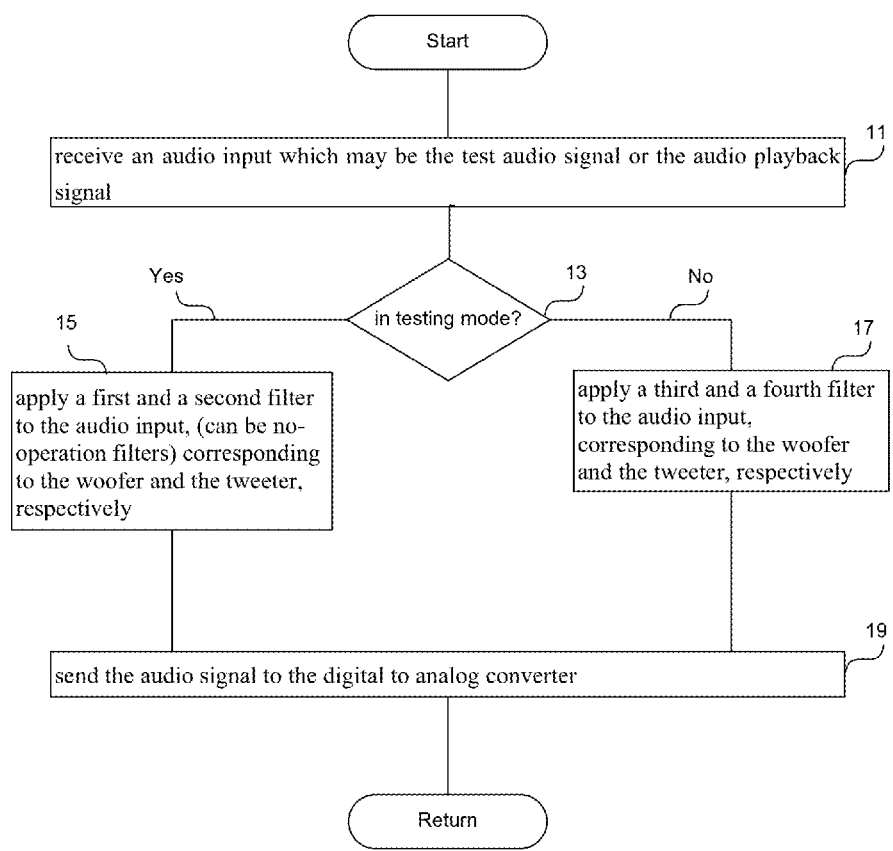
FIG. 4D is a flowchart of the digital signal processing algorithm for measuring the hearing transfer function and/or the hearing profile associated with the user, using the probe in FIG. 4B, according to one embodiment.

FIG. 4D is a flowchart of the digital signal processing algorithm for measuring the hearing transfer function and/or the hearing profile associated with the user, using the probe in FIG. 4B, according to one embodiment. In step 11, the digital signal processor 8 (shown in FIG. 4B) receives an audio input which may be the test audio signal and/or the audio playback signal comprising audio content such as music, speech, environment sounds, animal sounds, etc. The audio signals can be input via an analog or digital, wired or wireless audio interface 76 (shown in FIG. 4A), or can be stored in memory 90 (in FIG. 4A), and/or memory 46 (in FIG. 2). In step 13, the processor 8 determines whether the mode is in a testing or playback mode. In step 15, if the mode is testing mode, the processor 8 applies a first and a second filter to the audio input, corresponding to the woofer 2 (in FIG. 4B) and the tweeter 3 (in FIG. 4B), respectively. In one embodiment, the first and the second filter are no-operation filters or filters that provide a flat frequency response from the speakers allowing calibrated test stimuli to be played to the speakers 2 and 3.

In step 17, if the mode is playback mode, the processor 8 applies a third and a fourth filter to the audio input, corresponding to the woofer 2 and the tweeter 3, respectively. In one embodiment, the third and the fourth filters include low-pass and high-pass filters respectively, creating a digital crossover. In step 19, the processor 8 sends the audio signal to the digital-to-analog converter 7 (in FIG. 4B). Those skilled in the art will recognize there are many variations on the methodology of applying switchable crossovers, which could be done either digitally or electronically.

Figure 5:
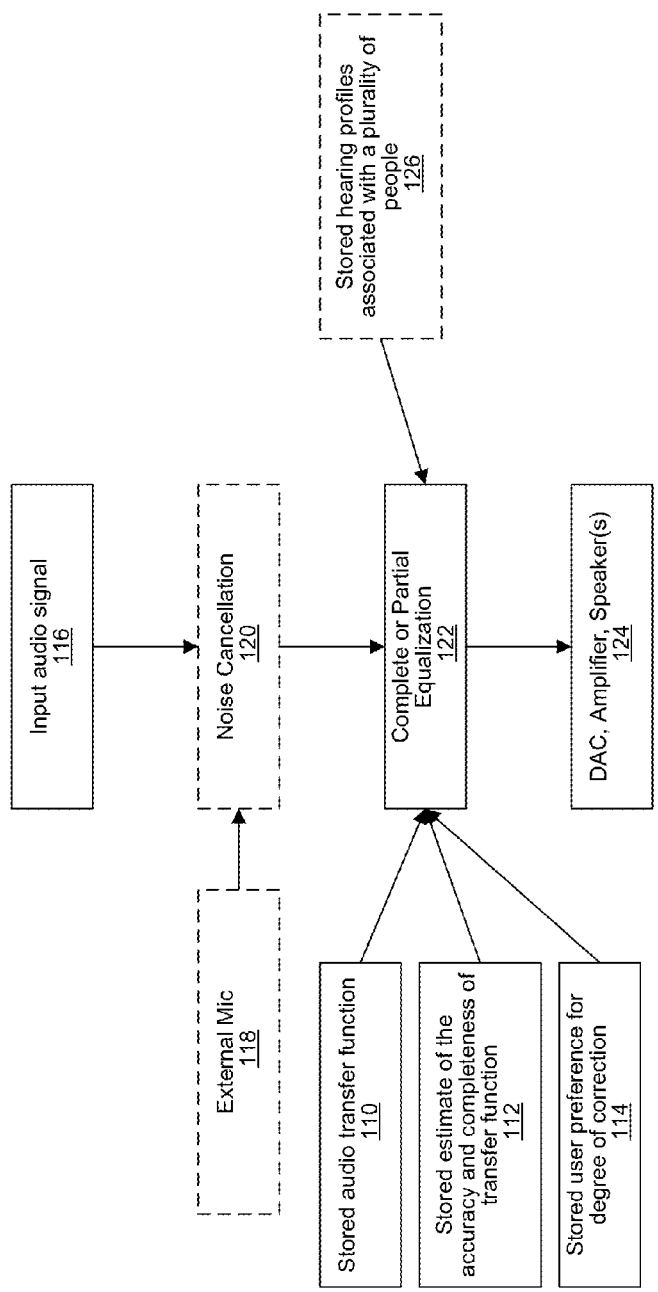
FIG. 5 is a flowchart depicting the signal processing operation performed by the signal processing modules depicted in FIGS. 2 and 4, according to one embodiment.

FIG. 5 is a flowchart depicting the signal processing operation performed by the signal processing modules depicted in FIGS. 2 and 4, according to one embodiment. Each memory 46 and/or 90, in step 110, stores a copy of the hearing transfer function for each of the user's ears. Each memory 46 and/or 90, in step 112, further stores an estimate of the accuracy and completeness of the hearing transfer function, and in step 114, each memory 46 and/or 90 stores a user preference for a degree of correction to be applied to the hearing transfer function. In another embodiment, the memory 46 and/or 90 can be a remote database storing various needed information.

In step 116, each processor 8, 44 or 88 receives an audio signal corresponding to a sound that is desired to be reproduced by the loudspeakers of either the headset 10 or the earbud 1, 70. Optionally, an input audio signal is received at step 118 by the external microphone 32, 34, and/or 80, and at step 120, the processor 8, 44, and/or 88 performs a noise cancellation function in order to minimize the impact of ambient noise on the audio signal input in step 116.

At step 122, the processor 8, 44, and/or 88 uses the stored hearing transfer function, the stored estimate of the accuracy and completeness of the hearing transfer function, and optionally the user preference for a degree of correction to be applied to the hearing transfer function, to make frequency-specific adjustments for amplitude and phase to automatically compensate for a user's hearing transfer function.

In some circumstances, the correction need not attempt to completely correct the sound. For example, only a partial correction may be applied if the accuracy or completeness of the hearing transfer function is low, as is described below, or according to a preference of the user. The processor 8, 44, or 88 may also be configured to limit a sound output signal that may be perceived to be dangerously loud by a user.

At step 122, the processor 8, 44, and/or 88 modifies the input audio signal so that the user perceives the input audio signal, as if the user had ideal hearing and/or desired hearing. The processor 8, 44, and/or 88 can modify the amplitude, the phase, the latency, etc., of the input audio signal. Since the response of a human ear to varying amplitudes at a given frequency is not linear, the processor 8, 44, and/or 88 can determine how to modify the input audio signal in several ways.

In various embodiments described herein, the desired hearing can be set by the user. For example, the user can specify to amplify a specified frequency range, such as low frequencies, mid frequencies, or high frequencies. In another example, the user can specify to attenuate a specified frequency range, such as low frequencies, mid frequencies, or high frequencies. The amplification and the attenuation can happen independently, or at the same time.

According to one embodiment, at step 126, the processor 8, 44, and/or 88 receives a plurality of hearing profiles associated with a plurality of people. The plurality of hearing profiles can be received via a wired or wireless connection 62 (in FIG. 2), and/or 78 (in FIG. 4A), or can be stored in memory 46 (in FIG. 2), and/or 90 (in FIG. 4A). A hearing profile in the plurality of hearing profiles comprises a hearing transfer function associated with a person, and a perceived amplitude of the input frequency as the input amplitude associated with the input frequency varies.

The processor 8, 44, and/or 88 finds one or more similar hearing profiles that closely match the hearing transfer function associated with the user. Based on the similar hearing profiles, the processor 8, 44, and/or 88 determines by how much to vary the input audio signal so that the user perceives the input audio signal, as if the user had ideal hearing and/or desired hearing.

For example, the hearing transfer function associated with a user specifies that an input audio signal comprising 1000 Hz at 70 dB, is perceived by the user as having 25 dB, while an input audio signal comprising 2000 Hz at 70 dB, is perceived by the user is having 50 dB. The processor 8, 44, and/or 88 determines a set of similar hearing profiles from the plurality of hearing profiles, where a similar hearing profile is associated with a person who perceives 1000 Hz to be roughly 25 dB (i.e., 20 dB to 30 dB) softer than 2000 Hz. The hearing profiles contain information regarding what modified amplitude the 1000 Hz signal needs to be so that the person perceives the amplitude of an input signal of 1000 Hz at 70 dB to be the same as the amplitude of an input signal of 2000 Hz at 70 dB. According to one embodiment, the processor 8, 44 and/or 88 averages the modified amplitudes associated with the similar hearing profiles, to obtain the modified amplitude associated with the user. The processor 8, 44, and/or 88, at step 122, then modifies the input signal accordingly.

According to another embodiment, the hearing transfer function associated with a user specifies that an audio signal comprising 1000 Hz at 70 dB, is perceived by the user as having 45 dB. The processor 8, 44, and/or 88 determines a set of hearing profiles, in which a person perceives 1000 Hz to be roughly 25 dB softer than the input amplitude. The hearing profiles contain information regarding what modified amplitude the 1000 Hz signal needs to be so that the person perceives an input audio signal of 1000 Hz at 70 dB to be 70 dB. According to one embodiment, the processor 8, 44 and/or 88 averages the modified amplitudes associated with the hearing profiles, to obtain the modified amplitude associated with the user. The processor 8, 44, and/or 88 then modifies the input signal accordingly.

In another embodiment, the processor 8, 44, and/or 88 does not receive the plurality of hearing profiles associated with the plurality of people. Instead, the processor measures a hearing profile associated with the user, by playing an input audio signal comprising varying amplitudes at a single frequency. The input audio signal can be a generated test audio signal, and/or a content audio signal comprising music, speech, environment sounds, animal sounds, etc. For example, the input audio signal can include the content audio signal with an embedded test audio signal.

In this case, for example, the hearing transfer function associated with a user specifies that an audio signal comprising 1000 Hz at 70 dB, is perceived by the user as having 60 dB while a 1500 Hz at 70 dB, is perceived by the user is having 50 dB. The hearing profile associated with the user specifies that, in order for the user to perceive 1000 Hz and 1500 Hz at equal loudnesses there must be a relative increase in the 1500 Hz loudness of 10 dB. Thus, the processor 8, 44, and/or 88, in step 122, then modifies the input signal accordingly.

According to one embodiment, at step 126, the processor 8, 44, and/or 88 receives statistical information representing data regarding human hearing profiles. The statistical information can be received via a wired or wireless connection 62 (in FIG. 2), and/or 78 (in FIG. 4A), or can be stored in memory 46 (in FIG. 2), and/or 90 (in FIG. 4A). For example, statistical information representing data regarding human hearing profiles could include the average and standard deviation of human hearing profiles at one or more frequencies. It may also include correlations between types of objective or subjective hearing data.

Based on the statistical information, the processor 8, 44, and/or 88 determines one or more similar hearing profiles that closely match the hearing transfer function associated with the user. For example, based on statistical information the processor constructs a plurality of hearing profiles that are similar to the hearing transfer function associated with the user. Based on the similar hearing profiles, the processor 8, 44, and/or 88 determines by how much to vary the input audio signal so that the user perceives the input audio signal, as if the user had ideal hearing and/or desired hearing.

In various embodiments, the processor 8, 44, and/or 88, continues to refine the hearing transfer function associated with a user, as the user continues to listen to audio.

The modified audio signal from the processor 8, 44, or 88 is then output at step 124 to the loudspeakers 12 and 14 or 84 and 86 to produce an auditory stimulus to one or both of the user's ears.

The hearing transfer function stored in the memory 46 or 90 may be generated in a number of ways, namely by subjective measurement, by otoacoustic emissions (OAE), auditory evoked potentials (AEP), or other objective tests such as the middle ear reflex.

Subjective Measurements

Audiometric measurements performed by an audiologist or via a computer program or the like can be provided to the signal processing modules 42 and 74 from an external source.

Alternatively, the button 68 or other user controls on the headphones 10 can be used by a user to directly acquire auditory threshold data by having the user press the button in response to sound signals. For example, an auditory stimulus can be played to the user at increasing or decreasing amplitudes at different frequencies across the audible frequency range. The user presses a button on headphones 10 to provide a user-generated input signal when the auditory stimulus is at or proximate to the user's audible threshold for each different frequency.

A convenient psychophysical test is a pure tone audiometry with which the user interacts in order to determine their audible threshold of hearing. Alternatively, a test can be conducted at the same loudness but at different frequencies, namely an "Equal Loudness Contours" test.

Otoacoustic Emissions (OAE)

Otoacoustic emissions can be measured within the user's ear canal and then used to determine thresholds at multiple frequencies or relative amplitudes of the otoacoustic emissions at multiple frequencies to one or more suprathreshold sound levels in order to develop the frequency dependent hearing transfer function of the user's ear(s). Stimulus frequency OAE, swept-tone OAE, transient evoked OAE, DP-OAE, or pulsed DP-OAE can be used for this purpose.

The amplitude, latency, hearing threshold, and/or phase of the measured OAEs can be compared to response ranges from normal-hearing and hearing-impaired listeners to develop the frequency dependent hearing transfer function for each ear of the user.

Since DP-OAEs are best measured in a sealed ear canal with two separate speakers/receivers packed into each ear canal, the use of OAEs is best suited for the earbud implementation depicted in FIGS. 3 and 4.

In the case of OAEs, one stimulus frequency/loudness combination yields a response amplitude. The measurement of multiple frequencies in this manner yields a plot of response amplitude versus frequency, which is stored in the memory 46 or 90 of the signal processing modules 42 or 74, or can be stored in a remote database. Many OAE techniques rely upon the measurement of one frequency per stimulus; however, the swept tone OAE measures all frequencies in the range of the sweep. Nevertheless, the hearing transfer function remains the same regardless of the measuring method used, that is, the hearing transfer function comprises a plot of the signal amplitude versus frequency of the OAE evoked in the user's ear upon application of an input audio signal. The hearing transfer function can also comprise the input amplitude associated with the input frequency.

In this exemplary embodiment, in order to determine the hearing transfer function for a user's ear, the processor 8, 44, and/or 88 captures data points for an input audio signal comprising a number of frequencies, for example, 500, 1000, 2000 and 4000 Hz, which are typically the same frequencies used in the equalizer that acts upon the output sound signal to the loudspeakers 12 and 14, 84 and 86, 2 and 3. At any one frequency, the processor measures the response to an input audio signal at reducing levels, for example, at 70 dB, 60 dB, 50 dB, 40 dB, etc., until there is no longer a measurable response. The processor 8, 44, and/or 88 records the data point at that time. It will be appreciated that in other embodiments, different methods, such as curve fitting or measuring a profile at a single loudness level, can be used to determine the hearing transfer function. The input audio signal can include a test audio signal, and/or a content audio signal comprising music, speech, environment sounds, animal sounds, etc. For example, the input audio signal can include the content audio signal with an embedded test audio signal.

In-situ calibration of the speakers to the user's ear canal can be performed by the processor 8, 44, and/or 88 prior to making an OAE measurement. In this context "in-situ" refers to measurements made at times when the speakers and microphone are situated for use inside the ear canal. Where the acoustic characteristic of the speakers are known, the acoustic impedance of the ear can be calculated from this data and utilized for deriving corrections.

In one or more embodiments, in-situ calibration can be done by playing a test audio signal, such as a chirp, or the content signal, covering the frequency range of the speakers, recording the frequency response with the microphone, and adjusting output by changing the equalizer settings to make a flat frequency response of the desired loudness.

In other embodiments, this calibration can be done in real time to any playback sound (e.g., music, or any audio comprising content) by constantly comparing the predicted output of the speakers in the frequency domain given the electric input to the speaker to the microphone and altering the equalizer gains until they match. The in-situ calibration accounts for variations in different users' external portion of the ear and variations in the placement of earbuds. If no audiometric data is yet available, then the in-situ calibration alone can be used for adjusting the sound.

Any variation with an internal microphone can use that microphone for in-situ calibration of the speakers performed every time the user places the headphones on.

Auditory Evoked Potentials (AEP)

AEPs involve the measurement of nanovolt range signals from the dry electrode or capacitive sensors 26, 28, and 30 depicted in FIG. 1.

In order to boost the signal-to-noise ratio of the AEPs, multiple repetitions of auditory stimuli are generally required to be applied.

Traditionally, AEPs are measured using wet electrodes after preparing the skin by gentle abrasion. This is impractical for use in consumer audio headphones, which is why dry electrodes and/or capacitive sensors are used in this case. In light of the reduced signal-to-noise ratio, multiple repetitions of stimuli are generally required, which means that the hearing transfer function estimation generally takes a longer period of time or, alternatively, is less accurate than in the case when wet electrodes are used.

Any AEP can be measured, such as auditory brainstem response, mid latency response, cortical response, acoustic change complex, auditory steady state response, complex auditory brainstem response, electrocochleography, cochlear microphonic, or cochlear neurophonic AEPs.

The frequency dependent hearing transfer function for each ear is determined by the processor 8, 44, and/or 88 by using frequency-specific stimuli, such as tones or band-limited chirps, or audio content signal, such as music or speech, which are used as the auditory stimuli applied to the user's ear, and thereafter determining either frequency-specific thresholds or using one or more suprathreshold sound levels and determining relative amplitudes and/or latencies of the AEP responses.

Comparisons of amplitude, latency, hearing threshold and/or phase can be made to response ranges from normal-hearing and hearing-impaired listeners to develop an hearing transfer function for each ear. The response ranges of normal-hearing and hearing-impaired listeners can be maintained in the memory 46 or 90 for use by the processor 8, 44, and/or 88 in such an operation.

The exact processing operation performed by the processor 8, 44, and/or 88 to detect an AEP response is different for each of the AEP methods described above because the time course of the characteristic wave form for each AEP is different.

In general, methods applied by the processor 8, 44, and/or 88 include the use of a peak picking algorithm, or a window root mean square (RMS) measure of the response compared to baseline RMS or a frequency-specific RMS of the signal above baseline noise. However, other methods are well described, such as in Valderrama, Joaquin T., et al. "Automatic quality assessment and peak identification of auditory brainstem responses with fitted parametric peaks." Computer methods and programs in biomedicine 114.3 (2014): 262-275.

Figure 6:
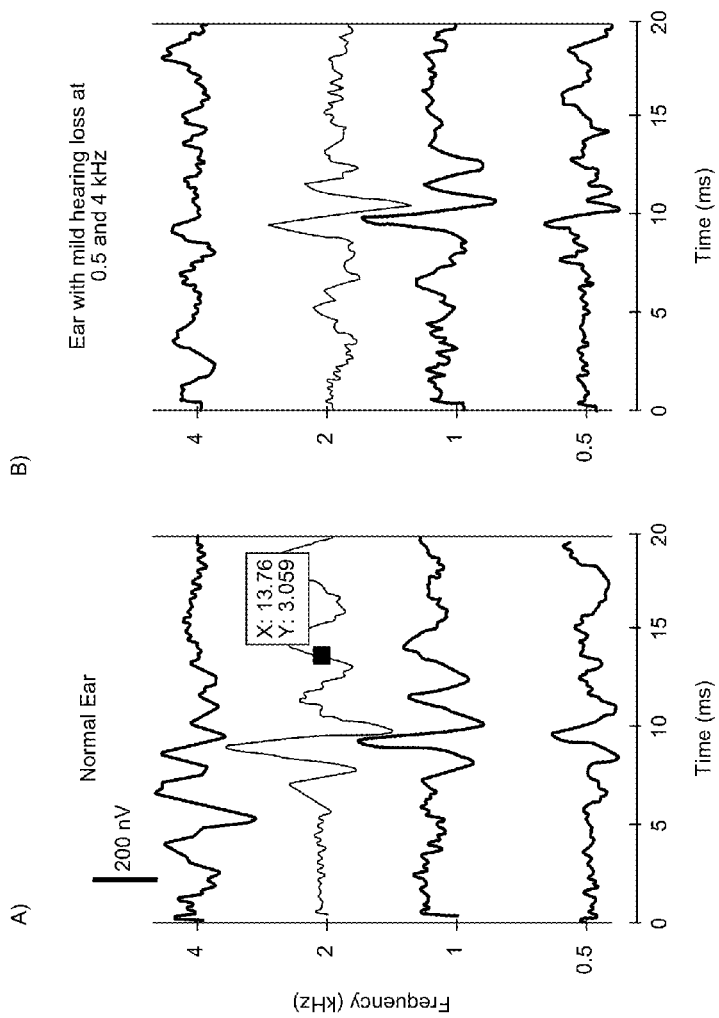
FIG. 6 depicts the frequency response in the time domain of a representative normal ear compared to an ear with mild hearing loss.

FIG. 6 depicts the frequency response in the time domain of a representative normal ear compared to an ear with mild hearing loss.

Figure 7:
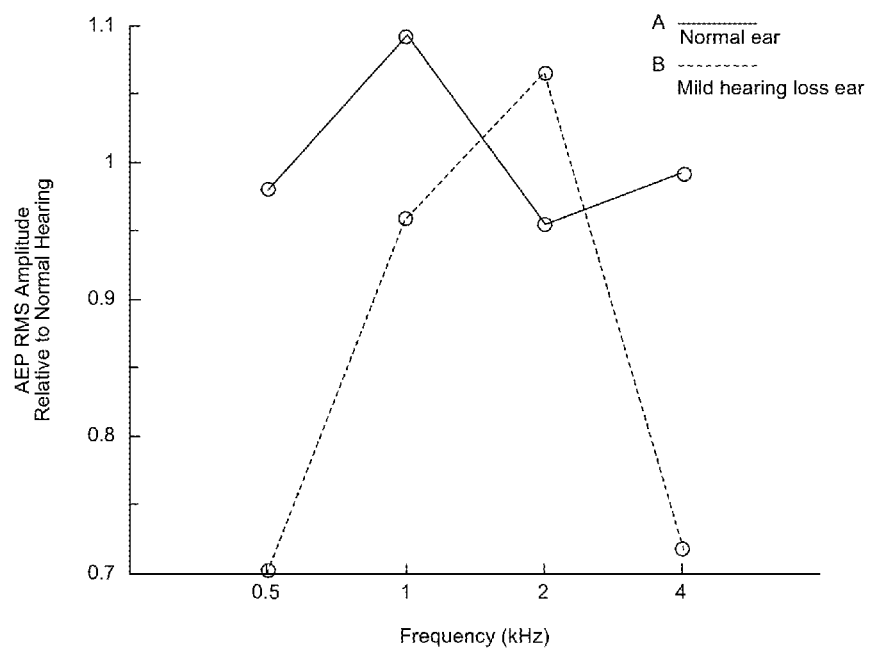
FIG. 7 shows the RMS amplitude of an auditory evoked potential response in the frequency domain of a normal ear and an ear with mild hearing loss.

FIG. 7 shows the RMS amplitude of an auditory evoked potential response in the frequency domain of a normal ear and an ear with mild hearing loss. The solid line depicts an hearing transfer function associated with the normal ear, and the dashed line depicts an hearing transfer function associated with the ear with a mild hearing loss.

Two AEPs have been found to be particularly convenient in relation to one or more embodiments of the invention, namely auditory steady state response (ASSR) and complex auditory brainstem response (cABR). ASSR is particularly convenient for this application since the detection of a response is carried out statistically by published methods, including:

Mühler, Roland, Katrin Mentzel, and Jesko Verhey. "Fast hearing-threshold estimation using multiple auditory steady-state responses with narrow-band chirps and adaptive stimulus patterns." The Scientific World Journal 2012 (2012).

Other features/benefits of the above-described embodiment include:

Multiple frequencies can be tested simultaneously and both ears can be tested at the same time. Phase information is also available.

Use of cABR involves recording electroencephalogram (EEG) activity while a complex sound is being played to the user.

Multiple responses to the same stimuli are usually averaged by the processor in time or frequency domains.

Low frequency (typically less than 1 kHz) sounds are followed with a delay by the EEG wave form (frequency following response).

Transient features of sound, such as sudden onsets at the start of speech, a musical note, or a drum beat, cause extra cABR-like waveforms in the EEG waveform.

cABR analyses can also be adapted to estimate an ear's hearing transfer function in response to continuous sound, such as music.

Figure 8A:
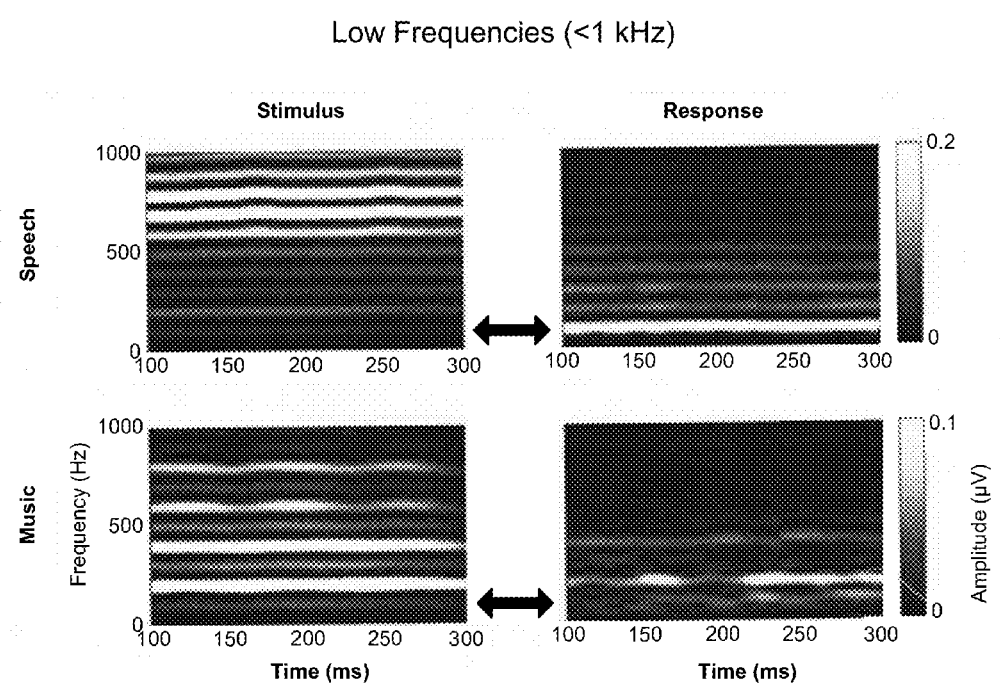
FIG. 8A shows Fourier analysis of the low-pass filtered outputted sound signal and EEG (frequency following response), according to one embodiment.

FIG. 8A shows Fourier analyses of the low-pass filtered outputted sound signal and EEG (frequency following response), according to one embodiment. The low-pass filtered output signal and the EEG frequency following response provide the low frequency part of the hearing transfer function. Frequency domain averaging is required due to the low signal-to-noise ratio (SNR).

Figure 8B:
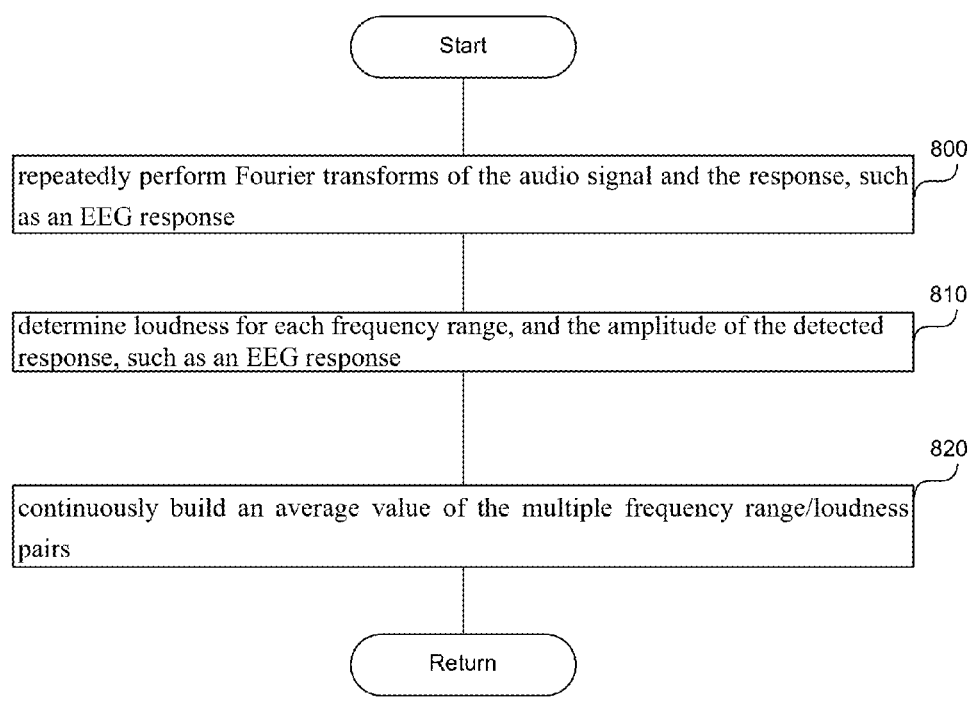
FIG. 8B is a flowchart of a technique to determine a low frequency portion of the hearing transfer function, according to one embodiment.

FIG. 8B is a flowchart of a technique to determine a low frequency portion of the hearing transfer function, according to one embodiment. In step 800, the processor 8, 44, and/or 88 repeatedly performs Fourier transforms and/or fast Fourier transforms of the audio signal and the response, such as an EEG response. The audio signal comprises multiple frequency ranges, such as 125, 250, 500, and 1000 Hz. In step 810, the processor 8, 44, and/or 88 determines loudness for each frequency range and the amplitude of the detected response, such as an EEG response. In step 820 the processor 8, 44, and/or 88 continuously builds an average value of the multiple frequency range/loudness pairs. This technique is easier and more accurate than the high frequency version; but the body low-pass filters the response, so this technique works less well with increasing frequency.

Figure 9A:
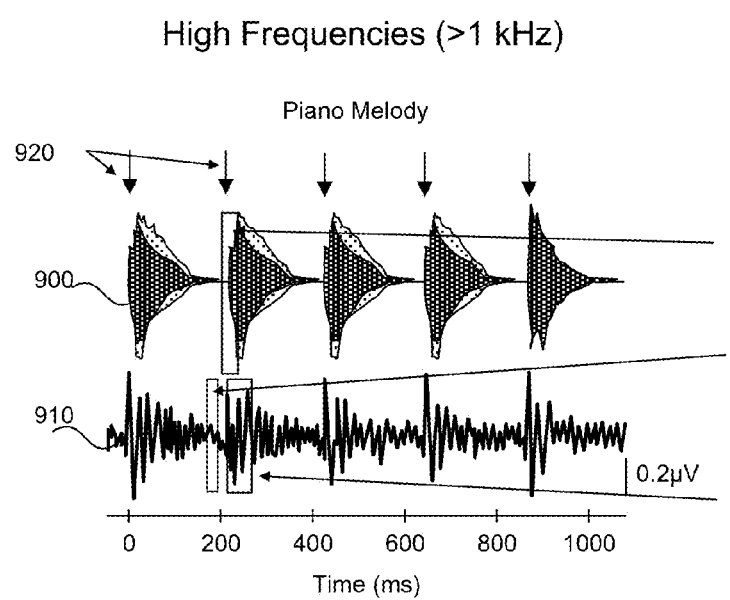
FIG. 9A shows information about the high frequency hearing which is obtained by analyzing the EEG signal after acoustic transients, according to one embodiment.

FIG. 9A shows information about the high frequency hearing which is obtained by analyzing the response, such as an EEG response signal after acoustic transients, according to one embodiment. Element 900 is the input audio signal. Element 910 is the signal obtained from a sensor, such as an EEG sensor. Elements 920 are the detected peaks in the input audio signal 900.

Figure 9B:
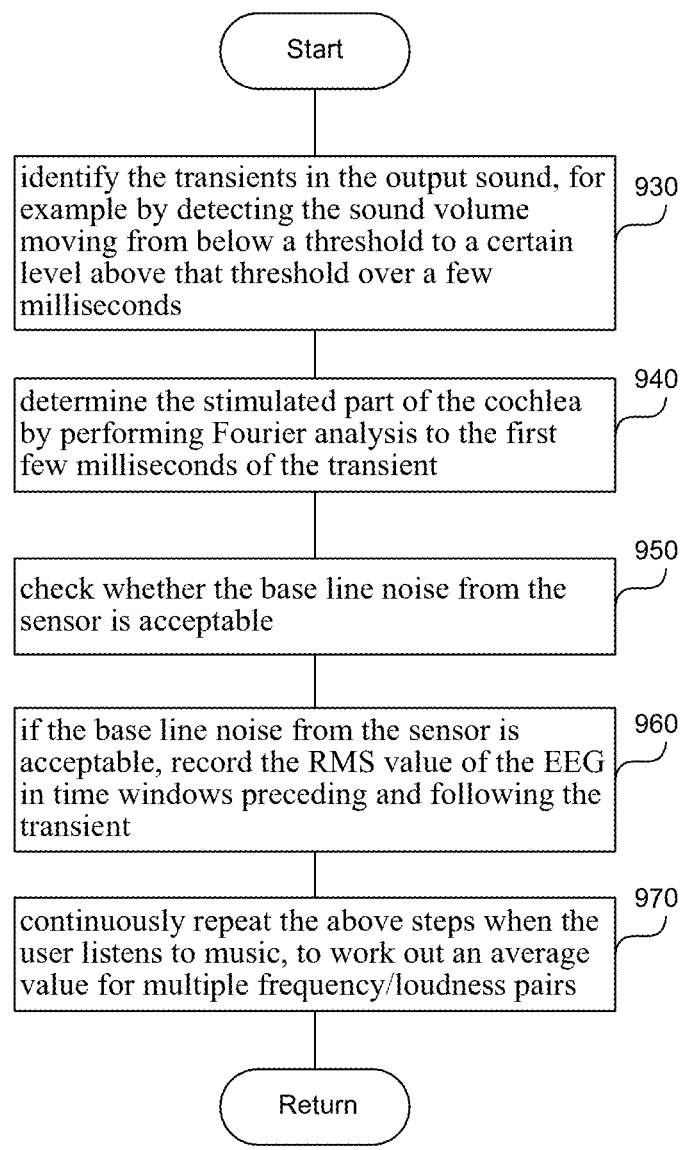
FIG. 9B is a flowchart of a technique to determine a high frequency portion of the hearing transfer function, according to one embodiment.

FIG. 9B is a flowchart of a technique to determine a high frequency portion of the hearing transfer function, according to one embodiment. In step 930, the processor 8, 44, and/or 88 identifies the transients in the output sound, for example, by detecting the sound volume moving from below a threshold to a certain level above that threshold over the course of a few milliseconds. In step 940, the processor 8, 44, and/or 88 determines the stimulated part of the cochlea by performing a Fourier analysis to the first few milliseconds of the transient. For example, a Fast Fourier Transform is performed on the first few milliseconds of transients to identify the excited part of the cochlea (hypothetically 1 kHz) in the loudness of the stimulus. In step 950, the processor 8, 44, and/or 88 checks whether the baseline noise from the sensor is acceptable; for example, whether it is less than 10 μV RMS, in the time immediately preceding the transient. In step 960, provided the noise on the signal, such as an EEG signal, is acceptably low, the RMS value of the signal in time windows preceding and following the transient is recorded. The frequency range and loudness of the transient and EEG amplitudes are saved to memory 46 and/or 90. In step 970, the processor 8, 44, and/or 88 continuously repeats the above steps when the user listens to music, to work out an average value for multiple frequency/loudness pairs.

Multiple entries are collated for each frequency/loudness combination or a pool of nearby frequencies and loudnesses. The averaged pre-RMS and post-RMS values are compared to response ranges from normal-hearing and hearing-impaired listeners to develop the high frequency hearing transfer function for each ear.

As indicated above, comparisons of both amplitude and phase can be compared to response ranges from normal-hearing and hearing-impaired listeners by the processor 8, 44, and/or 88 in order to develop the frequency-dependent hearing transfer function for each ear of the user. OAEs and ASSRs can give a response phase in addition to signal magnitude. In those embodiments where both amplitude and phase are used, one of these two techniques should be used. However, in other embodiments of the invention where different AEPs may be evoked in the user's ear, the processor 8, 44, and/or 88 may only be able to compare amplitude.

In those embodiments in which phase as well as amplitude is captured in the hearing transfer function, the processor 8, 44, and/or 88 effectively implements a finite input response (FIR) filter fitted with magnitudes to minimize the effect of hearing loss and phase-shifts (for embodiments where phase information from the objective audiometric measures is available) to make the user's perception of the audio signal the same as the perception of an ideal-hearing person.

In other embodiments, the frequency-dependent hearing transfer function for a user's ear is entirely composed of gains for each frequency band as discussed previously, for example, 500, 1000, 2000 and 4000 Hz. Two practical ways of setting the gains are firstly to simply set the gain according to the difference between detected audible threshold and the amplitude from the hearing transfer function of an ideal-hearing profile. Secondly though, the relative amplitudes of the AEP/OAE at multiple frequencies can be compared to one or more suprathreshold sound levels. For example, if the amplitudes of the AEP/OAE at 500, 1000, 2000 and 4000 Hz for an 80 dB stimulus are 120, 90, 100 and 110 units and an ideal-hearing person's signal amplitudes should be 105, 100, 95 and 100 units, then the equalizer gains are adjusted accordingly by the processor 8, 44, and/or 88. It will be appreciated that different users may have different head sizes, more hair, thicker skin, etc., so it is the actual ratio between the values for the different frequencies rather than the absolute values that the processor 8, 44, and/or 88 compensates for, as depicted in FIGS. 6 and 7.

The measurement of both OAEs and AEPs can be timed in a number of different manners:

A complete hearing transfer function of the user's ears can be made on request from the user.

A complete hearing transfer function of the user's ears can be made the first time the user places the headphones on, or the first time the user listens to audio.

A partial hearing transfer function can be measured each time the user places the headphones on, or each time the user listens to audio, which over time becomes a full hearing transfer function; once a full hearing transfer function is complete, further partial hearing transfer functions iteratively improve the stored function.

Partial hearing transfer functions can be interleaved between songs or during any time when audio is being input into the device.

If implementing the cABR method of estimating an hearing transfer function, the EEG recording is made continuously during any time audio is playing. Many hours of audio are required to acquire enough transient events to estimate the high frequency part of the hearing transfer function.

Any external or internal microphone can also be used to decide if the ambient noise level is too high for accurate objective or psychophysical measurements and measurements not made during such times.

Accuracy of the compensation applied during the equalization function carried out by the processor 8, 44, and/or 88 will be improved by the collection of many examples of the hearing profiles of normal-hearing persons and hearing-impaired persons. In that regard, the objective and psychophysical audiometric data characterizing the audible threshold of each user of the headphones 10 or earbuds 70 can be transmitted to a remote database (not depicted). Upon collection of a sufficient number of objective and psychophysical audiometric data of this type from a sufficient number of users, greater accuracy in a normal-hearing person and a hearing-impaired person's frequency-dependent hearing transfer function can be determined, and a normalized hearing transfer function can be input into the processor 8, 44, and/or 88, for example, by wireless or wired connection to the Internet by synching to a smartphone app, for subsequent storage in the memory 46 and/or 90. This normalized hearing transfer function can then be used by the processor 8, 44, and/or 88 during the performance of the above-described functions.

Those skilled in the art will appreciate that there may be variations and modifications of the configuration described herein that are within the scope of the present invention as defined by the claims appended hereto.

For example, in other embodiments an hearing transfer function can also be derived by the processor 8, 44, and/or 88 from audiometric data using more complicated methods similar to those used in hearing aid fitting rules described in the following sources:

Pascoe, David Pedro. "Clinical measurements of the auditory dynamic range and their relation to formulas for hearing aid gain." Hearing aid fitting: Theoretical and practical views (1988): 129-152. http://www.blog-audioprothesiste.fr/wp-content/uploads/2011/02/129-52-Pascoe-CLINICAL-MEASUREMENTS-OF-THE-AUDITORY-DYNAMIC-RANGE.pdf Byrne, Denis, et al. "NAL-NL1 procedure for fitting nonlinear hearing aids: Characteristics and comparisons with other procedures." JOURNAL-AMERICAN ACADEMY OF AUDIOLOGY 12.1 (2001): 37-51.

User Identification

Figure 10:
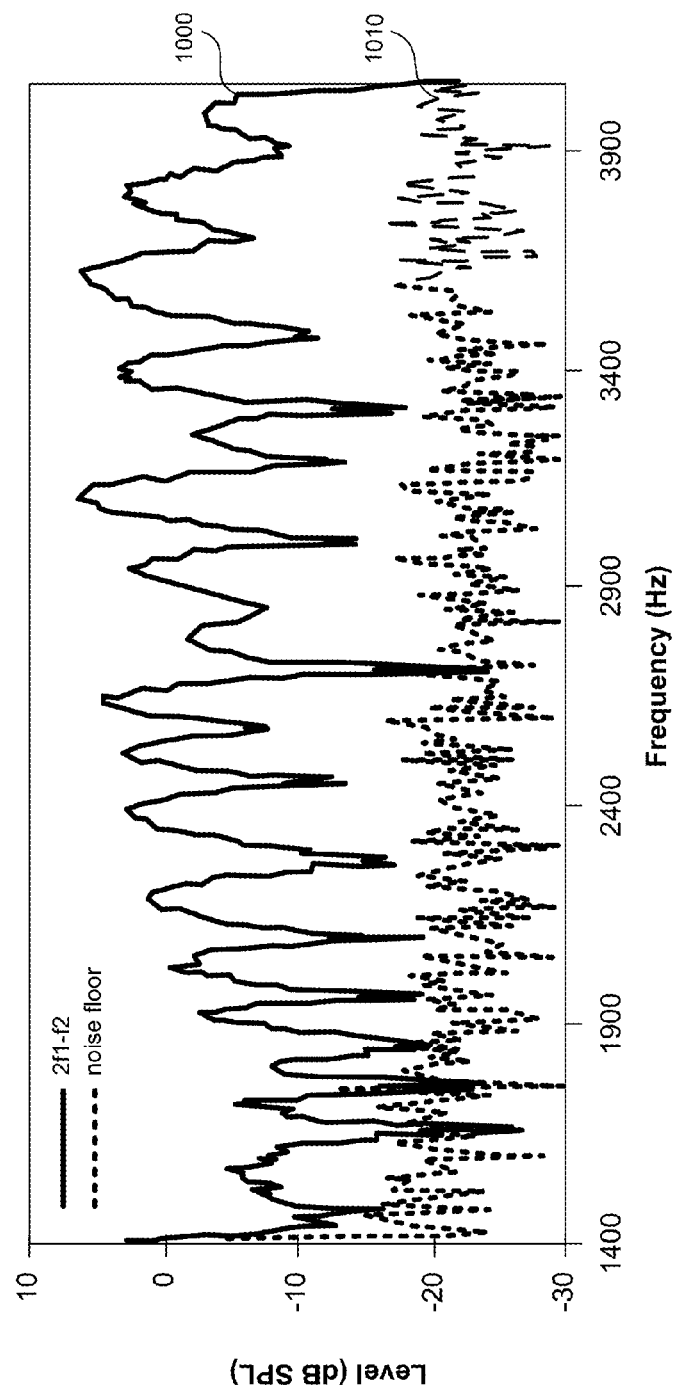
FIG. 10 depicts an example of distortion product OAE fine structure, according to one embodiment.

FIG. 10 depicts an example of distortion-product OAE fine structure, according to one embodiment. The figure is adapted from Shaffer, Lauren A., et al. "Sources and mechanisms of DP-OAE generation: implications for the prediction of auditory sensitivity." *Ear and hearing* 24.5 (2003): 367-379. Element 1000 is the cubic difference tone, and element 1010 is the noise for inside a user's ear. Assume primary tone f1 is lower in frequency and primary tone f2 is higher in frequency. When two pure tones f1 and f2 are presented to the human ear at the same time, the most prominent "distortion product" (DP) occurs at 2f1-f2—the "cubic difference tone," 1000. For example, if f1=1000 Hz and f2=1200 Hz, then 2f1-f2=2(1000)-1200=2000-1200=800 Hz. Further, the cubic difference tone 1000 is at least 50 dB less than f1, and the 2f1-f2 DP-OAE is largest when the ratio of f1 to f2 is about 1.22 and the intensities of f1=65 dB SPL and f2=50 dB SPL.

The cubic difference tone 1000 is generated from two separate sites within the cochlea, a primary and a secondary site, the signals from each constructively and destructively interfere with each other, making crests and troughs in the response. The pattern of the specific locations (in the frequency domain) of the crests and troughs is called fine structure and is unique to each ear. The cubic difference tone 1000 response from a user can be compared to a plurality of cubic difference tones stored in a database. The database can be integrated into the headphones 1, 10, 70, or it can be a remote database.

The processor 8, 44, and/or 88 compares the measured cubic difference tone 1000 and the plurality of cubic difference tones stored in the database to identify the subject. The processor 8, 44, and/or 88 uses a match score such as a root mean square error to make the comparison. For example, the processor, 8, 44, and/or 88 selects the cubic difference tone with the best match score, such as the cubic difference tone with the lowest root mean square error. If the selected cubic difference tone match score satisfies a specified threshold, such as the root mean square error is below 25%, the match is found. If the selected cubic difference tone does not satisfy the threshold requirement, no identification/authentication is made. When a match is found, the processor retrieves a user ID associated with the matched cubic difference tone.

According to one embodiment, biometric data associated with the user, such as the head with of the user, can be used to improve the accuracy of the identification. For example, if there are multiple cubic difference tones that satisfy the specified threshold, the user can be identified based on the quality of the match of the biometric data. In another example, if there are multiple cubic difference tones whose root mean square error is within 5% of each other, the user can be identified based on the quality of the match of the biometric data.

A user's perception of sound (i.e., the hearing transfer function) can be measured using any of the above-disclosed methods, such as the subjective method, AEP, EEG, etc. Each user hearing transfer function is unique. The user hearing transfer function is stored in the database, such as a database integrated into the headphones 1, 10, 70, or a remote database. Similarly, the processor 8, 44, and/or 88 then compares the measured hearing transfer function to the user hearing profiles in the database to identify the subject.

Based on the subject identification, the headphones can modify the sound according to the user hearing profile, can load and play a playlist associated with the identified user, etc. The user identification on its own, or with other methods, can be used for security purposes as well.

Other types of objective data measured from the ear can also be used to for identification such as the in-situ speaker frequency response or data derived from the in-situ speaker frequency response, such as the acoustic impedance of the ear.

Figure 11:
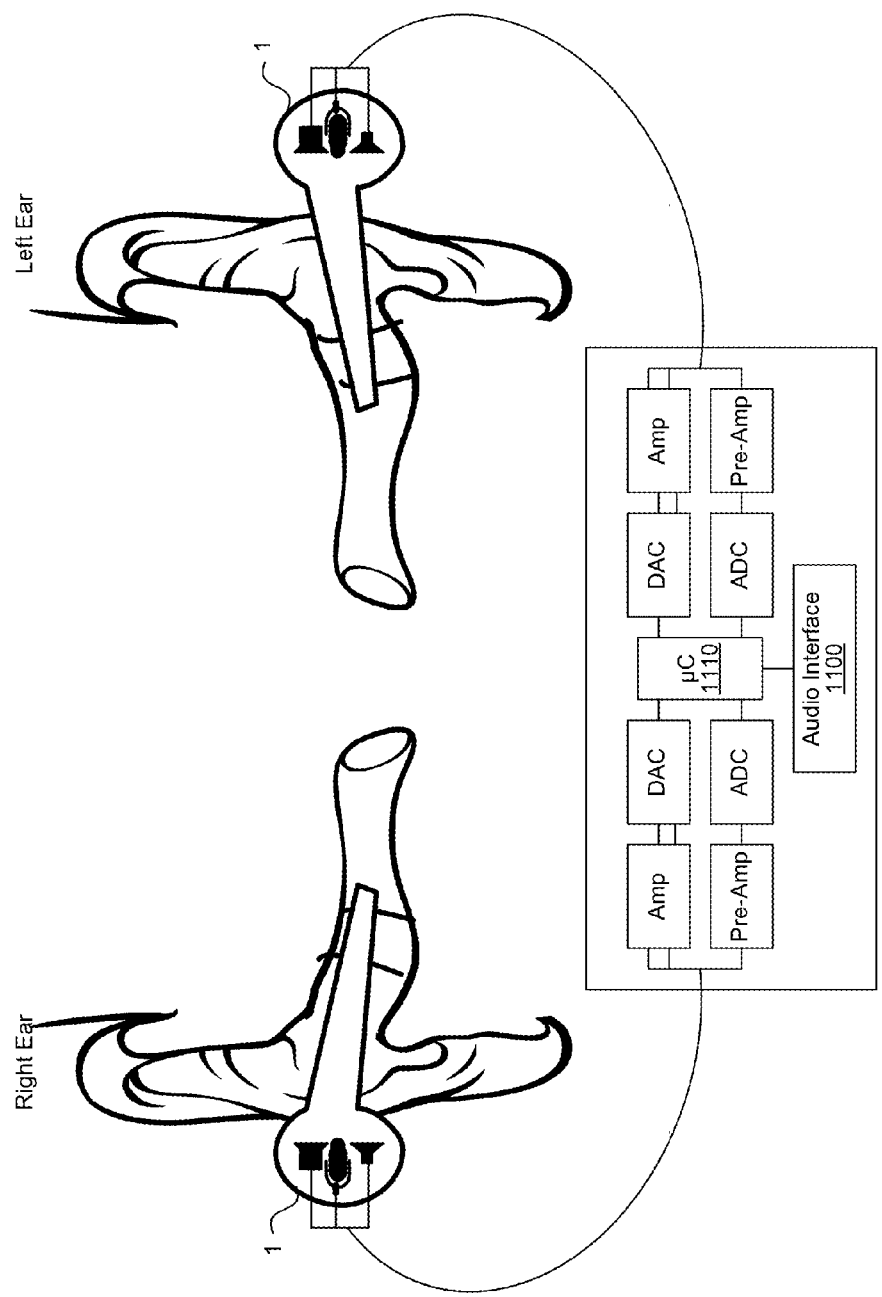
FIG. 11 depicts an embodiment of this invention where the OAE probe also functions as a set of headphones for consumer audio use.

FIG. 11 depicts an embodiment of this invention where the OAE probe also functions as a set of headphones for consumer audio use. The probe 1 from FIG. 4B is duplicated on the other ear and connected to a wired or wireless analog or digital audio interface 1100. The microprocessor 1110 controls measurement of the biometric profile and performs analysis. If no discrepancy is found, the audio information is routed to the speakers.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. Headphones configured to personalize an audio signal to a user, the headphones comprising:
   a speaker proximate to a user's ear, configured to emit a content audio signal and a test audio signal, the test audio signal comprising a frequency in the audible frequency range;
   a microphone proximate to the user's ear, the microphone configured to measure a response associated with the user, the response comprising a sound evoked in the user's ear in response to the test audio signal;
a processor, coupled to the speaker and to the microphone, the processor configured to:
generate the test audio signal;
send the test audio signal to the speaker;
receive from the microphone the response to the test audio signal associated with the user;
based on the test audio signal and the response to the test audio signal, determine a hearing transfer function associated with the user;
identify the user based on the response associated with the user, the response comprising the sound evoked in the user's ear in response to the test audio signal;
receive a statistical information representing data regarding human hearing profiles;
based on the hearing transfer function associated with the user and the statistical information representing data regarding human hearing profiles, adjust an amplitude associated with the content audio signal to automatically compensate for a difference between a desired hearing transfer function and the hearing transfer function associated with the user; and
send the adjusted content audio signal to the speaker.

2. The headphones of claim 1, the hearing transfer function associated with the user derived from any of a hearing threshold of the frequency in response to the test audio signal, an amplitude of the response to the test audio signal, a phase-shift of the frequency in the response to the test audio signal, and a latency of the frequency in the response to the test audio signal.

3. The headphones of claim 1, the processor further configured to adjust any of a phase of the content audio signal, and a latency of the content audio signal to automatically compensate for the difference between the desired hearing transfer function and the hearing transfer function associated with the user.

4. The headphones of claim 1, the speaker proximate to the user's ear comprising:
a tweeter speaker and configured to emit sound in the audible frequency range;
a woofer speaker configured to emit sound in the audible frequency range;
a crossover, coupled to the tweeter speaker and the woofer speaker, the crossover configured to:
receive the test audio signal comprising one or more channels of audio;
send one or more channels of the test audio signal to the tweeter speaker and one or more channels of the test audio signal to the woofer speaker;
receive the content audio signal;
perform low-pass filtering on the content audio signal to obtain a resulting signal;
send the resulting signal to the woofer speaker;
perform high-pass filtering on the content audio signal; and
send the resulting signal to the tweeter speaker.

5. The headphones of claim 1, the microphone forming a part of an earbud disposed in a user's ear canal.

6. Headphones configured to personalize an audio signal to a user, the headphones comprising:
a speaker proximate to a user's ear, configured to emit the audio signal;
a sensor proximate to the user's head, the sensor configured to measure an acoustic response associated with the user;
a processor, coupled to the speaker and to the sensor, the processor configured to:
receive from the sensor the acoustic response to the audio signal associated with the user;
based on the audio signal and the acoustic response to the audio signal, determine a hearing transfer function associated with the user;
identify the user based on the acoustic response to the audio signal associated with the user;
based on the hearing transfer function associated with the user, adjust the audio signal to automatically compensate for a difference between a desired hearing transfer function and the hearing transfer function associated with the user; and
send the adjusted audio signal to the speaker.

7. The headphones of claim 6, wherein the audio signal comprises content audio signal.

8. The headphones of claim 6, the processor configured to adjust the audio signal based on the hearing transfer function associated with the user and a statistical information representing data regarding human hearing profiles.

9. The headphones of claim 6, the sensor comprising a microphone, the microphone configured to:
detect an otoacoustic emissions response associated with the user, the otoacoustic emissions response generated in response to the audio signal; and
determine any of a hearing threshold associated with the otoacoustic emissions response corresponding to a frequency associated with the audio signal, an amplitude of the otoacoustic emissions response corresponding to the frequency associated with the audio signal, a phase of the otoacoustic emissions response corresponding to the frequency associated with the audio signal, and a latency of the otoacoustic emissions response corresponding to the frequency associated with the audio signal.

10. The headphones of claim 6, the processor configured to:
generate the audio signal to the user at increasing or decreasing amplitudes at different frequencies across the audible frequency range; and
receive a user-generated input when the audio signal is proximate to an audible threshold associated with the user.

11. The headphones of claim 6, the processor configured to transmit the hearing transfer function associated with the user from or to an external database.

12. The headphones of claim 6, the sensor comprising an electrode, a capacitive sensors, or a microphone.

13. The headphones of claim 6, the sensor configured to measure the acoustic response to the audio signal associated with the user, the sensor configured to:
detect an auditory evoked potential response associated with the user, the auditory evoked potential response generated in response to the audio signal; and
determine any of a hearing threshold associated with the auditory evoked potential response corresponding to a frequency associated with the audio signal, an amplitude of the auditory evoked potential response corresponding to the frequency associated with the audio signal, and a latency of the auditory evoked potential response corresponding to the frequency associated with the audio signal.

14. The headphones of claim 6, the processor further configured to continuously refine the hearing transfer function associated with the user by refining the hearing transfer function associated with a subset of frequencies in the hearing transfer function.

15. A method to personalize an audio signal to a user, the method comprising:
    playing the audio signal to the user;
    measuring an acoustic response to the audio signal associated with the user;
    based on the audio signal and the acoustic response to the audio signal, determining a hearing transfer function associated with the user;
    identifying the user based on the acoustic response to the audio signal associated with the user;
    receiving a statistical information representing data regarding human hearing profiles;
    based on the hearing transfer function associated with the user and the statistical information representing data regarding human hearing profiles, adjusting the audio signal to automatically compensate for a difference between a desired hearing transfer function and the hearing transfer function associated with the user; and
    sending the adjusted audio signal to a speaker.

16. The method of claim 15, wherein the hearing transfer function is derived from any of an amplitude of a frequency in the acoustic response to the audio signal, a hearing threshold of the frequency in the acoustic response to the audio signal, a phase-shift of the frequency in the acoustic response to the audio signal, and a latency of the frequency in the acoustic response to the audio signal.

17. The method of claim 15, said measuring the acoustic response to the audio signal comprising:
    detecting an auditory evoked potential response associated with the user, the auditory evoked potential response generated in response to the audio signal; and
    determining any of a hearing threshold associated with the auditory evoked potential response corresponding to a frequency associated with the audio signal, an amplitude of the auditory evoked potential response corresponding to the frequency associated with the audio signal, and a latency of the auditory evoked potential response corresponding to the frequency associated with the audio signal.

18. The method of claim 15, further comprising:
    performing in-situ calibration of the speaker to account for variations in different users' ears and variations in a placement of an earbud.

19. The method of claim 15, wherein said determining the hearing transfer function comprises:
    combining a plurality of responses to the audio signal.

20. The method of claim 15, wherein said measuring the acoustic response to the audio signal comprises recording an electroencephalogram (EEG) signal while the user listens to the audio signal.

21. The method of claim 20, wherein said determining the hearing transfer function comprises:
    comparing frequency content of the audio signal and the EEG signal to determine a low frequency portion of the hearing transfer function.

22. The method of claim 20, wherein said determining the hearing transfer function comprises analyzing the EEG signal after acoustic transients to determine a high frequency portion of the hearing transfer function.

23. The method of claim 22, comprising:
    detecting a transient sound in the audio signal;
    performing a Fourier transform of a time window of the transient sound to determine a stimulated part of a cochlea of a user's ear;
    recording a pre-root mean square (pre-RMS) value of the EEG signal in a time window preceding the transient sound;
    recording a post-root mean square (post-RMS) value of the EEG signal in a time window following the transient sound; and
    calculating an average pre-RMS value based on a plurality of pre-RMS values recorded over time;
    calculating an average post-RMS value based on a plurality of post-RMS values recorded over time; and
    comparing the average pre-RMS value and the average post-RMS value to the plurality of hearing transfer functions to determine the high frequency portion of the hearing transfer function.

24. A method to identify a user, the method comprising:
    playing an audio signal to the user;
    measuring a response to the audio signal associated with the user;
    based on the audio signal and the response to the audio signal, determining a hearing profile associated with the user;
    retrieving from a database a plurality of stored hearing profiles;
    iteratively calculating a match score between the hearing profile and the plurality of stored hearing profiles;
    selecting a best match score;
    when the best match score satisfies a specified threshold, selecting a user ID associated with a best stored hearing profile in the plurality of stored hearing profiles, wherein the best match score is associated with the best stored hearing profile;
    retrieving from the database a hearing profile associated with the user ID;
    based on the hearing profile associated with the user ID, adjusting the audio signal to automatically compensate for a difference between a desired hearing transfer function and the hearing profile associated with the user ID; and
    sending the adjusted audio signal to a speaker.

25. The method of claim 24, comprising providing a playlist associated with the user ID.

26. The method of claim 24, further comprising storing the hearing profile associated with the user in the database.

27. The method of claim 24, said measuring the response to the audio signal comprising:
    detecting the response, the response comprising at least one of an in-situ frequency response of the speaker in a user's outer ear, an acoustic impedance of a user's ear, an otoacoustic emission and an auditory evoked potential response associated with the user, the response generated in response to the audio signal; and
    determining at least one of an amplitude response corresponding to the frequency associated with the audio signal, a latency response corresponding to the frequency associated with the audio signal, hearing thresholds associated with the otoacoustic emission and auditory evoked potentials corresponding to the frequency associated with the audio signal.

28. The method of claim 24, further comprising:
    using biometric data to improve user identification, wherein the biometric data comprises a head width associated with the user.

* * * * *